United States Patent [19]

Retallick et al.

[11] Patent Number: 4,911,894
[45] Date of Patent: Mar. 27, 1990

[54] CATALYTIC AIR CLEANER

[75] Inventors: William B. Retallick, 1432 Johnny's Way, West Chester, Pa. 19382; Stuart W. Churchill, Glen Mills; Mark R. Strenger, Drexel Hill, both of Pa.

[73] Assignee: William B. Retallick, West Chester, Pa.

[21] Appl. No.: 76,471

[22] Filed: Jul. 22, 1987

[51] Int. Cl.⁴ ............................................. F01N 3/10
[52] U.S. Cl. ................................. 422/174; 422/177; 422/180; 422/184; 55/146; 55/150; 55/DIG. 30; 60/300; 60/303; 219/374; 219/375
[58] Field of Search ............ 422/174, 177, 180, 184; 55/146, 150, DIG. 30; 60/300, 303; 219/374, 375

[56] References Cited

U.S. PATENT DOCUMENTS

| | | | |
|---|---|---|---|
| 3,768,982 | 10/1973 | Kitzner et al. | 422/174 X |
| 3,770,389 | 10/1973 | Kitzner et al. | 422/174 |
| 3,979,193 | 9/1976 | Sikich | 422/174 X |
| 4,040,253 | 8/1977 | Dhugues et al. | 60/303 |

Primary Examiner—Barry S. Richman
Assistant Examiner—Lynn M. Kummert
Attorney, Agent, or Firm—William H. Eilberg

[57] ABSTRACT

The invention is a catalytic air cleaner made from a double spiral formed by winding together two strips of metal. The strips are coated with a combustion catalyst. One spiral passage leads into the core of the spiral and the other passage leads out of the core. An electric resistance heater supplies heat at the core of the spiral. The outflowing air transfers this heat to the inflowing air, through the walls of the spiral. Because of this heat exchange, the difference between the temperature of the air at the core and the air entering the spiral can be many times the difference between the temperature of the air entering and leaving the spiral. Contaminants in the air are burned on the catalytic surface with a minimum input of heat. The invention also includes a method of designing a spiral having optimum characteristics.

12 Claims, 8 Drawing Sheets

CATALYTIC AIR CLEANER

BACKGROUND OF THE INVENTION

The present invention is an air cleaner which catalytically burns contaminants in the air. The cleaner is intended especially for eliminating gaseous contaminants, smoke particles, bacteria, and aerosols.

The air in confined living and working spaces must be cleaned or renewed at short intervals. In a spacecraft or a submarine, there is no possibility of renewing the air, so it must be cleaned. In a jet airliner, one has a choice of cleaning the air or supplying makeup air from the outside.

A recent report by the National Academy of Sciences ("The Airliner Cabin Environment," ISBN 0-309-03690-9) describes the need for an air cleaner in a jet airliner. In the absence of cleaning, the makeup air varies from about 7 cubic feet per minute (CFM) per person in economy class to 150 CFM for crew members in the cockpit—a flow needed to keep sensitive electronic equipment cool. The energy consumption for compressing this air to cabin pressure can add 5% to the fuel consumption for the airliner. There are about 3000 jet airliners in the United States alone.

The invention is not limited to use in aircraft and space vehicles. Hospitals, kitchens, and cleanrooms for manufacturing microelectronic circuits are other sites for use of the catalytic air cleaner. In all cases, the object is to incinerate the contaminants with a minimum heat input.

SUMMARY OF THE INVENTION

The catalytic air cleaner of the present invention is formed by winding two strips into a double spiral. The strips are preferably of metal, and are coated with a combustion catalyst. The spiral defines two passages, one leading into the core of the spiral and the other leading out of the core. A heater, preferably an electric resistance heater, supplies heat at the core of the spiral. The heater is held within a housing having a plurality of radially extending fins, to increase the area for heat transfer. The ends of the spiral are sealed to end closures which seal the channels of the spiral.

The outflowing air transfers the heat generated by the heater to the inflowing air, through the walls of the spiral. Because of this heat exchange, the temperature difference between the air at the core and the air entering the spiral can be many times the temperature difference between the air entering and leaving the spiral. Thus, the contaminants in the air are burned with a minimum input of heat.

It is therefore an object of the invention to provide a catalytic air cleaner that incinerates contaminants with a minimum heat input.

It is another object to provide a catalytic air cleaner that is light and compact.

It is another object to provide a catalytic air cleaner for use in compact spaces such as in a commercial jet airliner or in a spacecraft.

It is another object to provide an air cleaner having no moving parts except the blower.

It is another object to provide a catalytic air cleaner that has a low pressure drop.

Other objects and advantages of the invention will be apparent to those skilled in the art, from a reading of the following brief description of the drawings, the detailed description of the invention, and the appended claims.

DETAILED DESCRIPTION OF THE INVENTION

The catalytic air cleaner of the present invention is made from two strips which are wound together to form a spiral. The strips are preferably of metal, but temperature resistant plastics might also be used. The strips are coated with a combustion catalyst. The spiral is sealed by end closures. The spiral defines two passages, one leading into the core of the spiral, and the other leading out of the core. A heater is inserted at the core of the spiral, and is preferably mounted such that it is isolated from the end pieces. An electric resistance heater is preferred, but a simple conduit for a heat transfer fluid would also serve as a heater.

Figure 1:
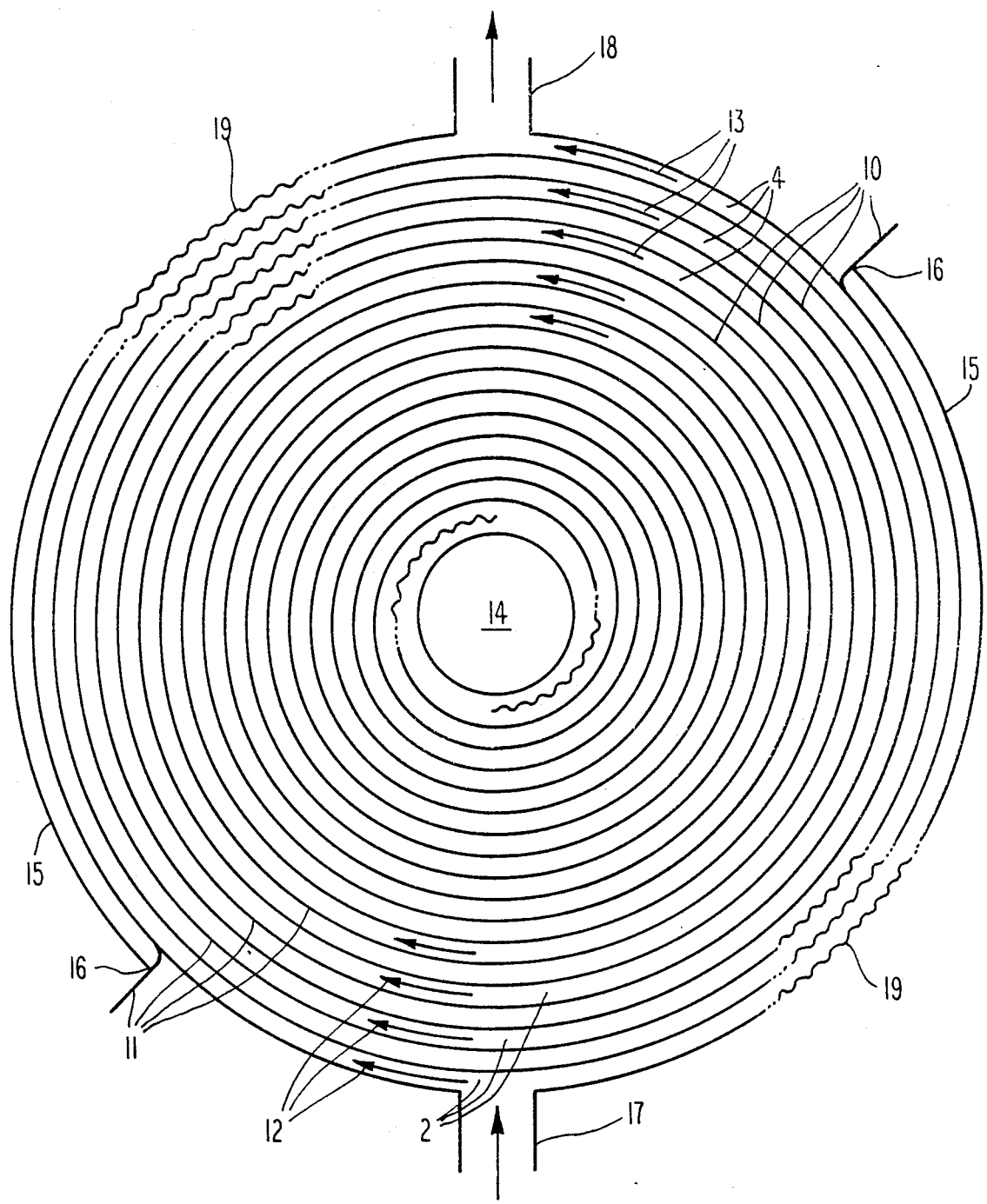
FIG. 1 is a cross-sectional view of a double spiral which forms the catalytic air cleaner of the present invention.

FIG. 1 is a cross-sectional view of a typical double spiral which is used to form the catalytic air cleaner. Spirals 10 and 11 are preferably made of metal foil. These spirals define channel 2 leading into the core, as indicated by arrows 12, and channel 4 leading out, as indicated by arrows 13. Heater 14, at the core of the spiral, is the sole source of heat. The outermost turn 15, of the spiral, is the shell that encloses the spiral. This shell is sealed to the metal foil of the spirals at points 16. An air inlet is shown at 17 and an air outlet at 18. The foil can be corrugated, and the figure shows some of the corrugations 19.

Figure 2:
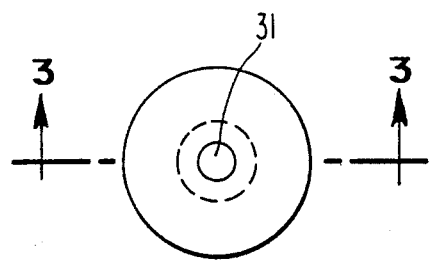
FIG. 2 is an end view of an electric resistance heater which can be inserted into the core of the spiral of FIG. 1.
Figure 3:
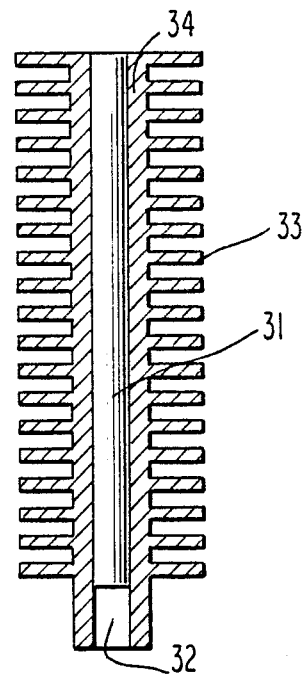
FIG. 3 is a cross-sectional view of the electric heater and its housing, taken along the line 3—3 of FIG. 2.

FIG. 2 is an end view of an electric resistance heater which can be inserted into the core of the spiral. FIG. 3, a cross-sectional view taken along the line 3—3 of FIG. 2, further illustrates the structure of the heater. A commercially available cartridge heater 31 fits closely in axial hole 32 of housing 34. The cylindrical surface of the housing has been turned in a lathe to form a nest of circular fins 33. Although circular fins are preferred, the invention is not limited to fins of that shape. Air flowing through the core of the double spiral passes over and between the fins.

As an example of the construction of a catalytic air cleaner according to the invention, we will describe a prototype catalytic air cleaner that was built and operated successfully. The air cleaner was made of a double spiral of metal foil having a thickness of 0.0025 inches. The foil was corrugated with corrugations having a height of about 1 mm, and a peak-to-peak spacing of about 2 mm. The foil expands when heated and the corrugations absorb the expansion.

The foil was coated with a washcoat of activated alumina and the alumina was impregnated with a platinum combustion catalyst. The foil used for the spirals was an aluminum-coated stainless steel having the composition described in U.S. Pat. No. 4,601,999, the disclosure of which is incorporated by reference herein.

The dimensions of this prototype were:

| | |
|---|---|
| Radius of innermost turn, cm | 2.0 |
| Radius of outermost turn, cm | 8.8 |
| Spacing of the turns, cm | 0.4 |
| Number of complete turns in each spiral in contact with flowing air | 8.75 |
| Total length of metal strip in each spiral in contact with flowing air, cm | 299 |
| Height of the spiral, cm | 9 |

The "height" of the spiral refers to the height of the cylinder defined by the spiral. Table I shows the results of five tests of the prototype catalytic air cleaner. The wattage input to the heater is the variable that was altered for each test. All of the tests were made with the same flow rate of air. It will be shown later that this was close to the optimum flow rate.

For each test, the amount of heat lost by convection and radiation from the shell 15 and from the end closures was calculated. This loss was computed by subtracting the heat added to the air flowing through the spiral from the wattage input to the core heater. The amount of heat added to the air is equal to the product of the air flow rate and $T_2 - T_1$ (the difference in temperature of the air leaving the spiral and the air entering the spiral) and the heat capacity of the air. The result of the calculation is the loss of input wattage. In the prototype described, the loss was high because the prototype was not well insulated, and it had massive end closures that exposed much surface. A commercial spiral would be well insulated, and would not have massive end closures.

The figure of merit for the spiral is the ratio $$M = (T_3 - T_1)/(\text{calculated } \Delta T) \sim (T_3 - T_1)/(T_4 - T_3) \sim$$
$$(T_3 - T_1)/(T_2 - T_1)$$

where "calculated $\Delta T$" is the temperature rise that is equivalent to the heat input at the core, and $T_1$ is the temperature of the air entering the spiral,
$T_2$ is the temperature leaving the spiral,
$T_3$ is the temperature entering the core, and
$T_4$ is the temperature leaving the core.

If there were no heat losses, all of these expressions for M would have the same value. The first expression, $(T_3 - T_1)/(\text{calculated } \Delta T)$, is correct even when there are heat losses. With heat losses, $(T_3 - T_1)/(T_4 - T_3)$ and $(T_3 - T_1)/(T_2 - T_1)$ are both approximations. The second expression, $(T_3 - T_1)/(T_4 - T_3)$, might be the better approximation if $T_3$ and $T_4$ could be measured accurately. But $T_3$ and $T_4$ are the high temperatures whose measurements are most likely to be distorted by the effect of radiation. For convenience, we will adopt $$M \approx (T_3 - T_1)/(T_2 - T_1)$$

because it includes the three temperatures most likely to be specified for the design of a catalytic air cleaner. The contribution of heat from the combustion of contaminants would usually be negligible because of their low concentration.

Temperatures of over 600° C. were reached in the core of the prototype spiral. This temperature is more than sufficient for catalytic combustion. In the experiments summarized in Table I, the ratio M was almost independent of the heat input, as it should be.

Figure 4:
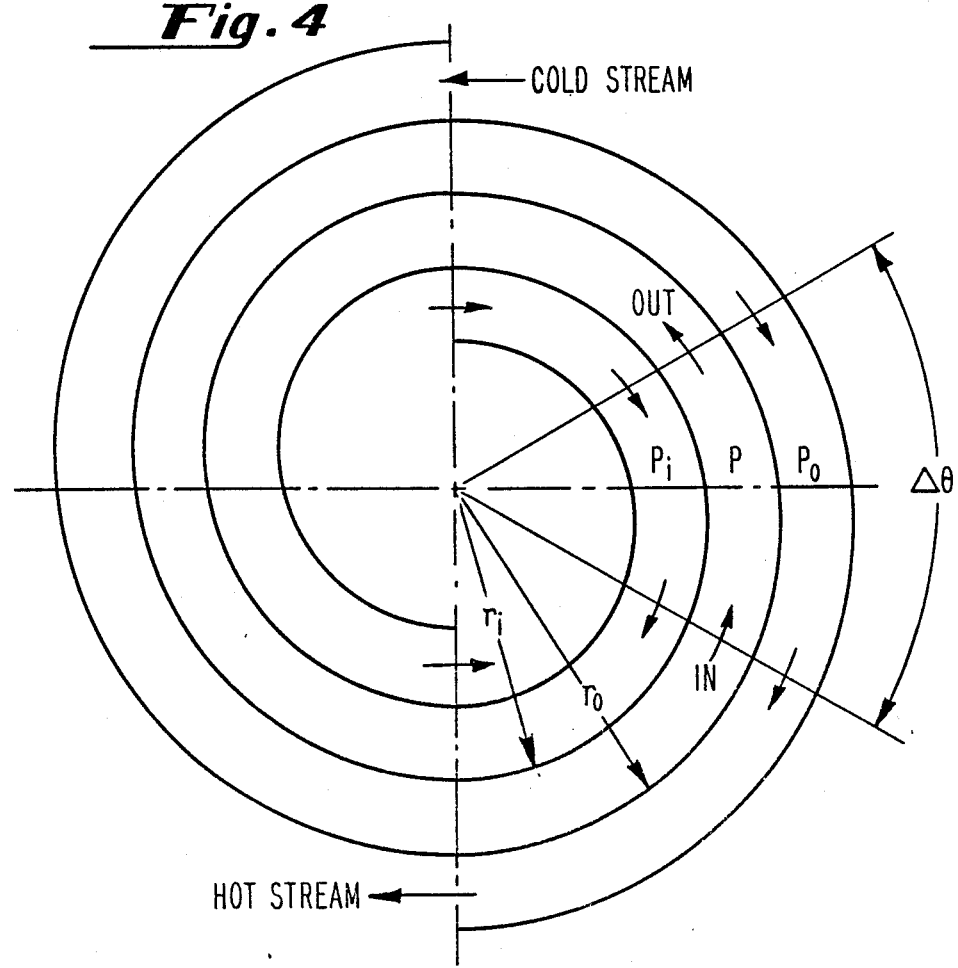
FIG. 4 is a diagram showing the parameters used in deriving a mathematical model of the heat transfer within the spiral.

We have developed a mathematical model of the double spiral heat exchanger. It is a finite-increment model. The diagram of FIG. 4 shows how the model was derived. The cross section of the spiral was divided into segments by radii that are spaced equally. Most of the calculations were made with 10 angular segments formed by radii spaced at 36° intervals. A few calculations were made with 20 segments, but the result was nearly the same as with 10 segments. Each segment was divided into finite radial increments by the metal walls of the spiral. Our prototype spiral had 8.75 turns, as shown in FIG. 1, in both the ingoing and the outgoing channel, so that with 10 angular segments, this spiral was divided into 175 finite increments.

The mathematical model is derived from the set of heat balance equations for each finite increment of the spiral. The parameters for a typical increment are shown in FIG. 4. The heat balance equation for the incoming stream passing through the volume centered on point P in FIG. 4 is:

$$mC[T_{out} - T_{in}] = U_o[T_{Po} - T_P]r_o \Delta \theta b + U_i[T_{Pi} - T_P]r_i \Delta \theta b$$

where
m = Mass flow rate of the air,
C = heat capacity of the air,
$U_o$ = heat transfer coefficient from the outer region (the region of $P_o$ in FIG. 4) to the region of point P
$U_i$ = heat transfer coefficient from the inner region (the region of $P_i$ in FIG. 4) to the region of point P
b = height of the spiral.

This heat balance equation is for one finite increment. Since there are 175 increments in the model, there are 175 simultaneous equations to be solved by a computer. The calculation gives the temperature of the gas in each of the 175 increments. From the calculation of temperatures in each increment, one can compute the temperatures at the boundaries, to obtain the ratio M. These are the parameters needed to make the calculation:

(1) The radius of the innermost turn of the spiral
(2) The spacing of the turns in the spiral
(3) The number of turns in the spiral
(4) The height of the spiral
(5) The flow rate of the entering air
(6) The temperature of the entering air, usually ambient
(7) The power input to the heater in the core of the spiral
(8) The inner and outer heat transfer coefficient between the flowing gas and the wall.

In our calculations, we made the following simplifying assumptions in order to keep the computer time within bounds:

1. The heat transfer coefficients $U_i$ and $U_o$ are both equal to the same constant value U, throughout the spiral.
2. This constant value U is equal to h/2, where h is the coefficient for heat transfer between the wall and the flowing gas. This is so because $$1/U = 1/h_i + 1/h_o + (\text{thickness of wall})/(\text{conductivity of wall})$$

and the final term, which is the thermal resistance of the thin metal wall, is negligible compared to the resistance in the gas phase.

3. The theoretical coefficient for laminar flow between flat parallel plates, with only one wall heated, was used for h. This coefficient is:

$$h = 2.69(k/d) \quad (1)$$

where d is the spacing between the turns, and k is the thermal conductivity of the air at some average temperature. The flow is truly laminar, but the assumption of flat plates is approximate because the curvature of the spiral results in some secondary motion and thereby increases the coefficient. The reason for assuming that only one wall is heated will be explained later.

In summary, the constant coefficient from gas on one side of a wall, to gas on the other side, is given by:

$$U = h/2 = (2.69/2)(k/d)$$

For the first half-turn of the spiral, for both the ingoing and the outgoing channels, which are 180° apart, there was no heat exchange (except for leakage) through the outer wall of the prototype spiral, because the outer walls were insulated. The heat transfer coefficient for these two outer walls was set equal to zero in the computer program. A correction was also made for heat exchange near the core of the spiral. The entering stream was postulated to continue in channel-like flow while exchanging heat only with its outer wall for an additional half turn. Similarly, the exiting stream was postulated to exchange heat only with its outer wall for a half turn until it enters channel flow between two walls.

Figure 5:
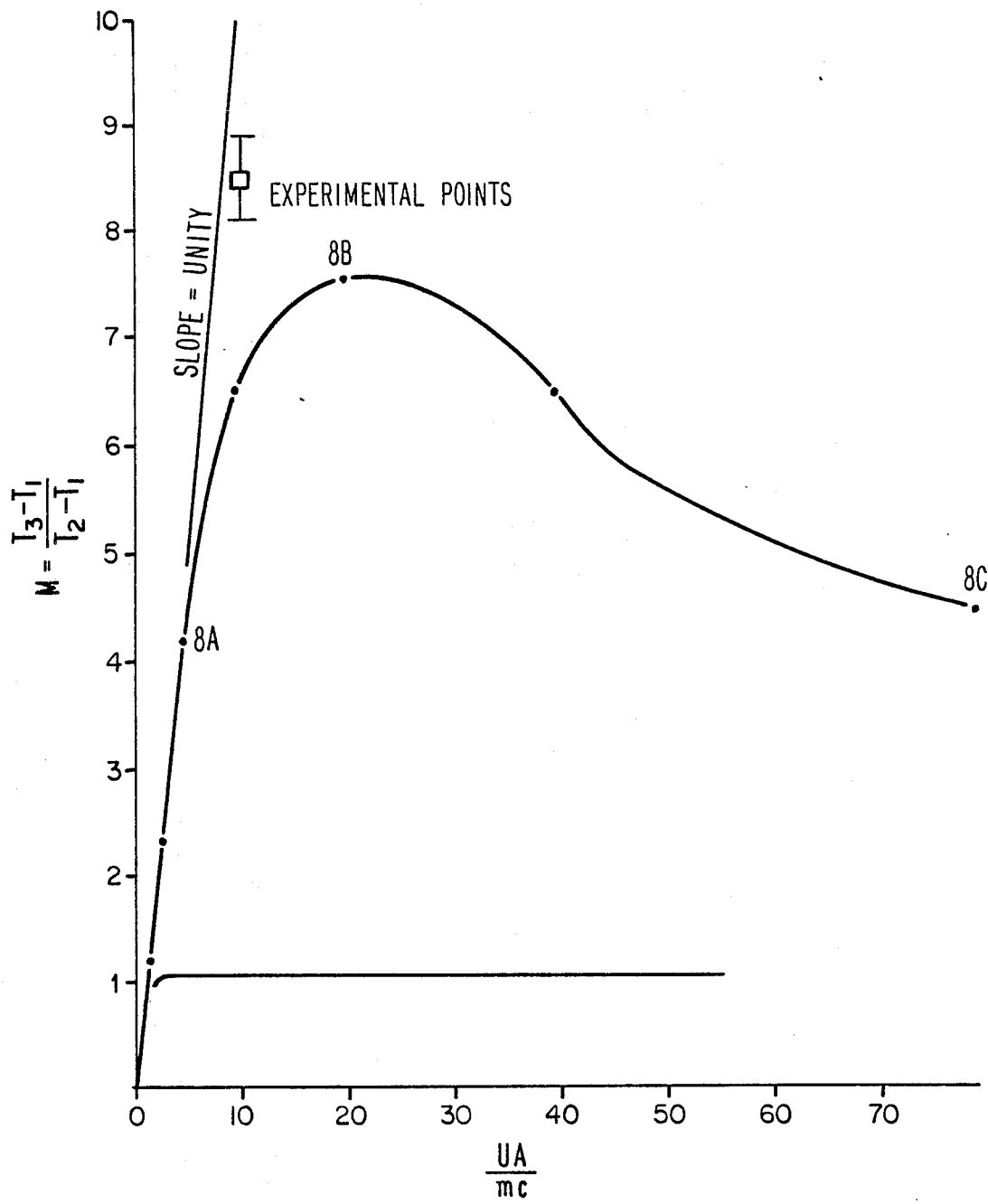
FIG. 5 is a graph showing the performance of a prototype of the present invention, and also showing the performance predicted by the mathematical model.

FIG. 5 plots the figure of merit, M, for three sets of data, namely (1) the measured values for the prototype spiral discussed above, as shown in Table I, (2) the theoretical values predicted by the model, and (3) the theoretical values for a parallel-plate countercurrent heat exchanger of the prior art. In FIG. 5, the figure of merit is plotted as a function of the dimensionless number UA/mC, where U = overall coefficient for heat transfer, which is h/2,
A = the total area for heat transfer,
m = the mass flow rate of the air, and
C = the heat capacity of the air.

The theoretical value of M, computed by the model, passes through a maximum and then approaches a lower constant value. The cause of the maximum is explained later. The experiments were done at an air flow rate producing a value of UA/mC close to the optimum, where the value of the figure of merit M is at a maximum. This is the equivalent of saying that the experiments were made close to the optimum value of the flow rate m, since U, A, and C are fixed for air flowing through any given spiral. FIG. 5 also shows the range of the experimental points. These points lie above the computed curve instead of directly on the curve. The discrepancy results from both experimental error and approximations in the mathematical model.

Figure 6:
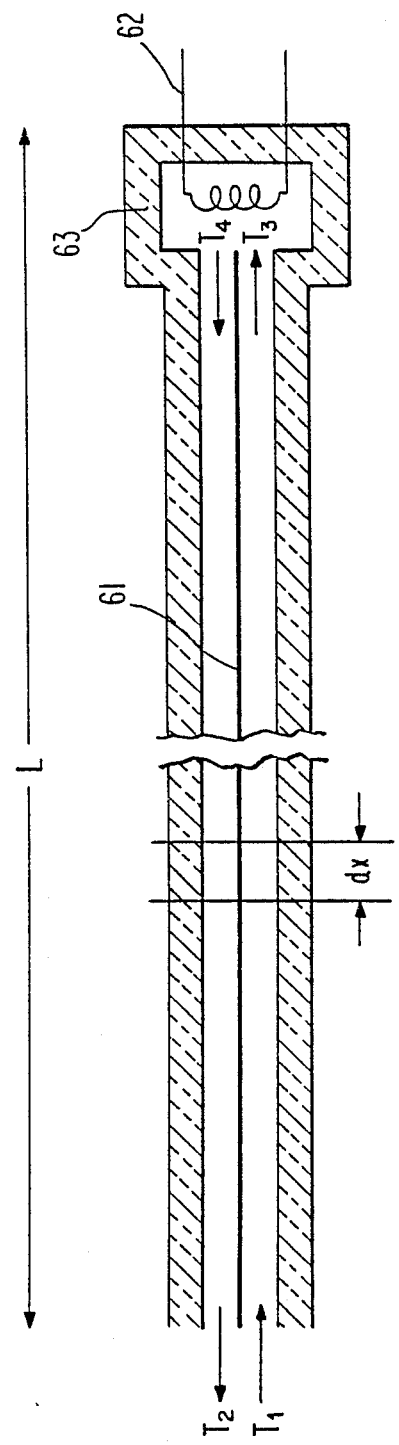
FIG. 6 is a cross-sectional view of a parallel-plate heat exchanger, with which the present invention is compared in the specification.

It is instructive to compare the performance of the double spiral with the performance of a parallel-plate countercurrent heat exchanger of the prior art. FIG. 6 shows this exchanger schematically. Heat is transferred from the outgoing fluid to the incoming fluid through plate 61. Heat is added by heater 62 which increases the temperature of the fluid from $T_3$ to $T_4$. Perfect insulation 63 reduces the heat loss to zero so that $T_2 - T_1 = T_4 - T_3$. Now let us consider the heat balance equation for fluid flowing along a length of the exchanger that includes the differential area dA, within the differential length dx. The potential causing heat transfer is $\Delta T = T_4 - T_3 = T_2 - T_1$. The heat balance equation is $$mC(dT) = U\Delta T(dA)$$

Integrating and rearranging gives $$(T_3 - T_1)/(T_2 - T_1) = UA/mC$$

This means that for the perfectly insulated parallel-plate exchanger, the plot of $(T_3 - T_1)/(T_2 - T_1)$ versus UA/mC is a straight line that passes through the origin, has a slope of unity, and extends indefinitely.

The curve for a perfectly insulated double-spiral exchanger approaches the straight line for a parallel-plate exchanger as UA/mC approaches zero. This is shown by the calculated curves in FIG. 5. The following calculation leads to the same conclusion. An overall heat balance equation for the spiral is:

$$mC(T_3 - T_1) = UA \Delta T_{mean}$$

where $\Delta T_{mean}$ is the effective overall temperature difference when the flow rate m becomes infinitely large, and UA/mC approaches zero. The temperature rise in the entering stream and the temperature drop in the exiting stream then both approach zero. Then the same temperature difference exists throughout the exchanger, so that $$T_2 - T_1 = T_4 - T_3 \times \Delta T_{mean}$$

and $$(T_3 - T_1)/(T_2 - T_1) \rightarrow UA/mC$$

which is just what was shown in FIG. 5.

Now let us return to the parallel-plate exchanger in FIG. 6. Assume that insulation 63 is no longer perfect, but that instead it is one inch thick and has a thermal conductivity equal to twice the conductivity of air, which is equivalent to a good commercial insulation. Now the curve of M versus UA/mC is not a straight line that extends indefinitely, but instead the curve bends over and flattens out at a constant value of 1.05. The proof follows. First, note that mC (entering stream) = m'c' (exiting stream), because the same fluid is passing through both sides of the exchanger. We define:

T = temperature in the input channel, as a function of x,

T' = temperature in the output channel, a function of x, $T_o$ = temperature of the surroundings b = width of the channel (equivalent to the height of the spiral)

U = overall heat transfer coefficient across plate 61

$h_o$ = external coefficient through insulation 63

Note that $$T = T_o \text{ at } x = 0$$

and $$T' = T + \Delta \text{ at } x = L,$$

where $\Delta$ = the temperature increase across heater 62, a constant.

The heat balance equations across the incremental length dx for the entering and exiting streams are given by:

$$mCdT = Ub(T' - T)dx - h_o b(t - T_o)dx$$

$$-mCdT' = Ub(T - T')dx - h_o b(T' - T_o)dx$$

or $$(1/N)/dT/dZ = T' - T - \alpha(T - T_o)$$

and $$(1/N)/dT'/dZ = T' - T + \alpha(T' - T_o)$$

where

Z = x/L,

N = UbL/mC, and $\alpha = h_o/U$.

The solution to this pair of simultaneous differential equations is:

$$\frac{T - T_0}{\Delta} = \frac{e^{Z^*} - e^{-Z^*}}{\sqrt{\alpha(2+\alpha)}(e^{L^*} + e^{-L^*}) + \alpha(e^{L^*} - e^{-L^*})}$$

where $$Z^* = N\sqrt{\alpha(2+\alpha)} \, Z$$

$$L^* = N\sqrt{\alpha(2+\alpha)}$$

Then, by setting x = L, we obtain $$\frac{T_L - T_0}{\Delta} = \frac{e^{L^*} - e^{-L^*}}{\sqrt{\alpha(2+\alpha)}(e^{L^*} + e^{-L^*}) + \alpha(e^{L^*} - e^{-L^*})}$$

The ratio $(T_L - T_O)/\Delta$ in the above equation is the figure of merit for the parallel-plate exchanger. It has the same significance as $(T_3 - T_1)/(T_2 - T_1)$ for the double spiral exchanger. It remains to find the trend of $(T_L - T_O)/\Delta$ as the parallel-plate exchanger grows to infinite length. As length L (FIG. 6) becomes infinitely large, the dimensionless numbers N and L* become infinitely large. The terms $e^{-L^*}$ approach zero and disappear from the last equation. Then the terms $e^{L^*}$ cancel out. What remains is $$\frac{T_L - T_0}{\Delta} = \frac{1}{\sqrt{\alpha(2+\alpha)} + \alpha}$$

so that $(T_L - T_O)/\Delta$ is a function only of $\Delta$, which was defined as $h_o/U$.

Now $h_o$ is just the thermal conductivity of one inch (2.54 cm) of insulation having twice the thermal conductivity of air, or $h_o = 2 \, k/2.54$. The value of U is calculated from the same relationship as for the spiral:

$$U = h/2 = (2.69/2)(k/d).$$

If the spacing is d = 0.4 cm, then $$\alpha = \frac{h_o}{U} = \frac{2k}{2.54} \frac{(2)(0.4)}{2.69k} = 0.233$$

and $$\frac{T_L - T_0}{\Delta} = \frac{1}{\sqrt{(0.233)(2.233)} + 0.233} \approx 1.05$$

Thus, the maximum figure of merit $(T_L - T_O)/\Delta$ that can be achieved with an infinitely long parallel-plate exchanger covered with one inch of insulation is 1.05, which is much less than for a finite spiral exchanger.

Compactness is another advantage of the spiral exchanger. Our prototype spiral had an external diameter of 18 cm, while a parallel-plate exchanger with the same surface area and one inch of insulation on both sides would have dimensions of approximately 600 cm × 9 cm × 6 cm.

An important purpose of the mathematical model is to design the spiral heat exchanger. Table II shows the results of some design calculations. Consider the three rows for which:

Number of Turns = 7.5,
Radius of Innermost Turn = 2.0 cm, and
Spacing Between Turns = 0.4 cm.

These values fix the values of U and A, since the heat transfer coefficient is determined by the spacing and by the thermal conductivity of the air, as given by Equation (1). The heat capacity C is a constant. The only variable left to be varied is m, the flow rate. The three values of UA/mC in Table II were generated by varying m. For each value of UA/mC, the computer output is the ratio M, which is the figure of merit for the starting set of variables. The value of M passes through a maximum of 6.63 when UA/mC equals 17.2. The value of M changes only slightly when UA/mC varies by about 20% from its optimum value. This means that this spiral will produce a near optimum figure of merit over a range of flow rates.

Figure 7:
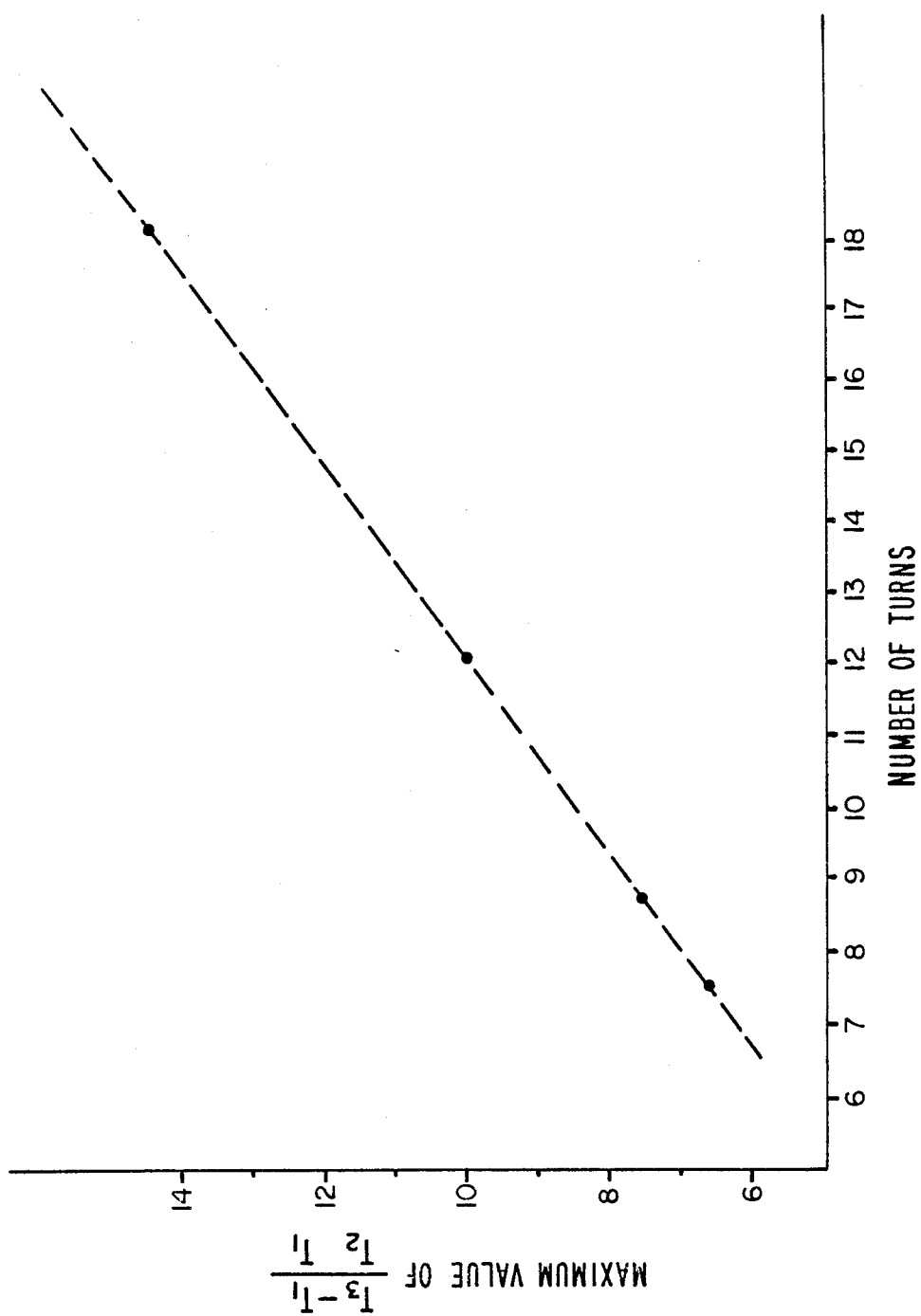
FIG. 7 is a graph showing the figure of merit of a spiral heat exchanger, as a function of the number of turns in the spiral.

Table II shows that the value of M increases with the number of turns. FIG. 7 shows that the increase follows a nearly straight line. The increase itself is expected, but the straight line needs some explanation, and this will be given later.

Suppose we are given a spiral reactor already built, and we wish to calculate the optimum flow rate for this spiral. The calculation is the one just described. One enters into the computer the dimensions of the spiral and the heat transfer coefficient. Also entered is an estimated value for the heat input to the core. A close estimate is not necessary because the calculated values of will be insensitive to the value assumed for the heat input. This was proved both by computer calculations and by the experimental data in Table I.

Then one calculates the value of M for a range of flow rates. The optimum flow rate is the one that gives the highest value of M. In the calculation, one varies the flow rate on either side of the optimum to determine the range of flow rates that gives a figure of merit which is within a certain percentage of the maximum.

Now suppose we are given the flow rate and the maximum permissible value of $T_2-T_1$, the temperature rise imposed on the air that is being cleaned. These are the specifications to be expected for a jet airliner. Also specified is the contaminant to be incinerated. This defines, at least approximately, the value of $T_3$, the temperature at the core. Thus, one can compute a "target" value of M. This value of M can be used to compute a trial value for the number of turns, from FIG. 7.

Now one assumes a value for the spacing between the turns and calculates the value of M for a range of flow rates. It is convenient to base the calculation on some unit axial length of spiral, say 10 cm. As before, the optimum flow rate for the assumed spacing is the one that gives the highest value of M. This calculation is repeated for two or more values of the spacing. If none of the spacings produces a value of M as high as the target value, the whole set of calculations is repeated for a greater number of turns.

The final calculation will yield the number of turns, and probably two or more spacings, that give values of M which are as high as the target value. The optimum values of UA/mC that give these highest values of M will be close together, even when the spacing has been varied. This is shown by the calculations in Table II for 7.5 turns.

Now we address the question of the choice of the spacing of the turns. It is shown below that the smaller the spacing, the larger the pressure drop. One must therefore choose a spacing which is large enough that the pressure drop across the spiral is not unacceptably high. In laminar flow the pressure drop is directly proportional to the velocity of the gas, inversely proportional to the square of the spacing, and directly proportional to the length of the flow path. Suppose that the spacing is reduced by a factor of two. It is desirable to preserve a nearly constant value of UA/mC, because this value was chosen to optimize the figure of merit. But if the spacing is cut in half, the heat transfer coefficient will double (see Equation (1)). The area A for heat transfer will decrease, but not nearly by a factor of 2. To preserve the optimal value of UA/mC, it is necessary that the flow rate m nearly double. Therefore, if the spacing is halved, and UA/mC is held constant, the pressure drop will increase nearly eightfold. The pressure drop thus depends very sensitively on the spacing.

For the prototype spiral and the flow rates in Table I, the pressure drop was measured to be about 10 cm of water. For any other spiral, the pressure drop would be approximately the product of:

---
(10 cm of water) ×
(liters per hour per cm of axial length/200 l/h-cm) ×
(length of the spiral path/299 cm) ×
(0.4 cm/spacing, cm)².
---

The figure "200" in the second factor represents the flow rate of approximately 1800 liters per hour, divided by the 9 cm axial length, in the prototype spiral. The figure "299" represents the total path length of the prototype spiral. The figure "0.4" represents the spacing of the turns in the prototype spiral.

The latter three factors in the above-described product are dimensionless numbers. The above product reflects the known behavior of the pressure drop, as the flow rate, path length, and spacing are varied. The above expression can therefore be used to calculate the pressure drop for other spirals.

Having chosen a spacing that gives an acceptable pressure drop, and which maintains UA/mC near its optimal value, we have also fixed the flow rate per unit of axial length of the spiral. From the total flow rate specified, one can compute the total axial length. The total axial length may be very great, in which case it would be divided among several spirals. The greater the axial length of each spiral, the fewer the end closures on the spirals. The greatest heat losses occur through the end closures, so it is advantageous to maximize the length of the individual spirals and so minimize the number of end closures. Ideally, one would bend a single long spiral around into the shape of a torus, and thereby eliminate the end closures, but such a torus would be difficult to construct.

Now we will explain the reason for the straight line in FIG. 7. The final column in Table II gives the ratio of M to UA/mC at the value of UA/mC which gives the maximum value of M for each distinct configuration of the spiral. Each configuration is defined by the number of turns, the innermost radius, and the spacing between turns. The average value of the ratio is 0.40 which means that a plot of M versus the optimum value of UA/mC for all spiral exchangers would have a slope of 0.40 and would pass through the origin. This line becomes the locus of the maximum possible M for all spiral exchangers.

Figure 8A:
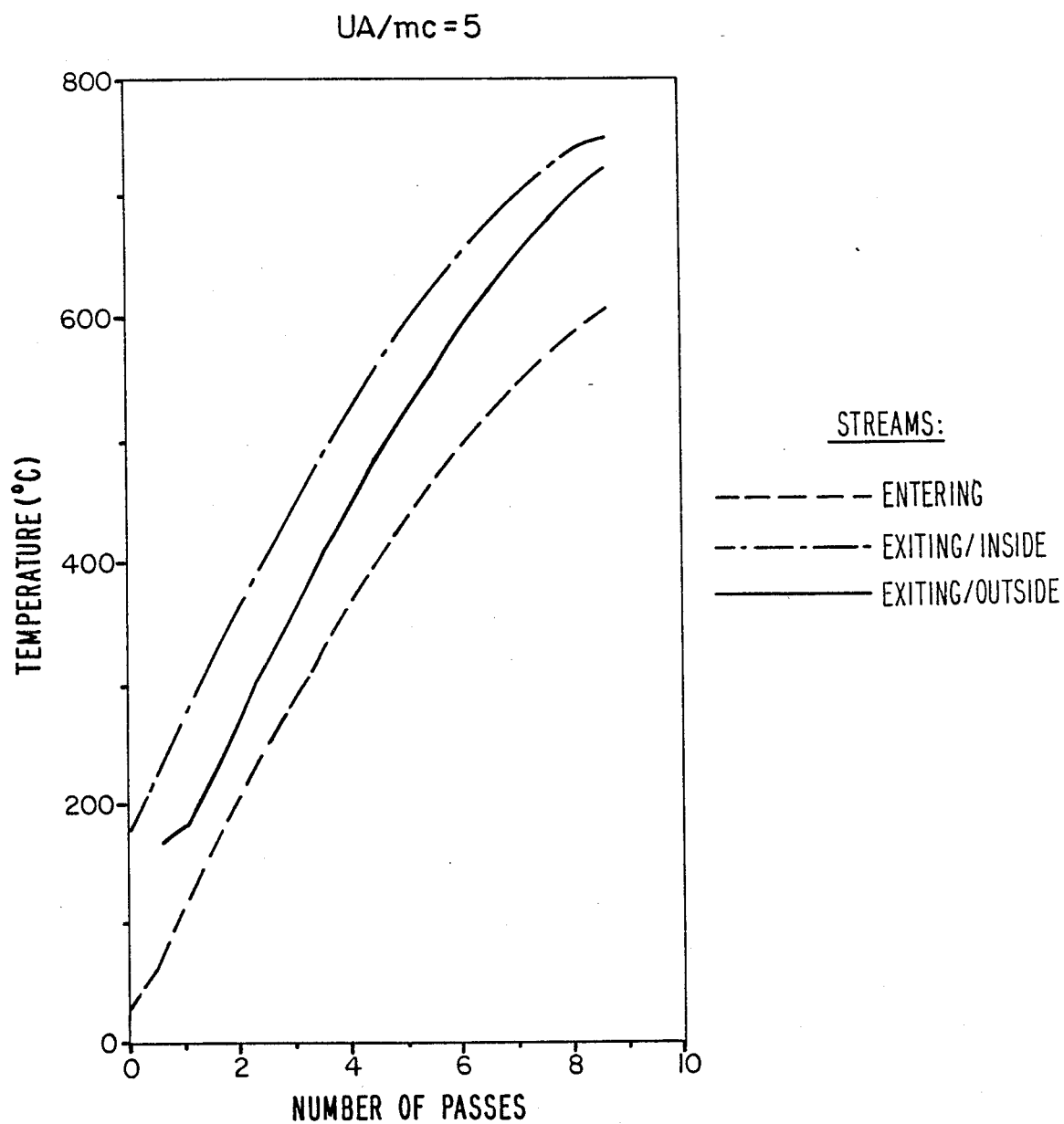
FIGS. 8A, 8B, and 8C are graphs showing temperature profiles of the air entering and leaving a spiral heat exchanger.
Figure 8B:
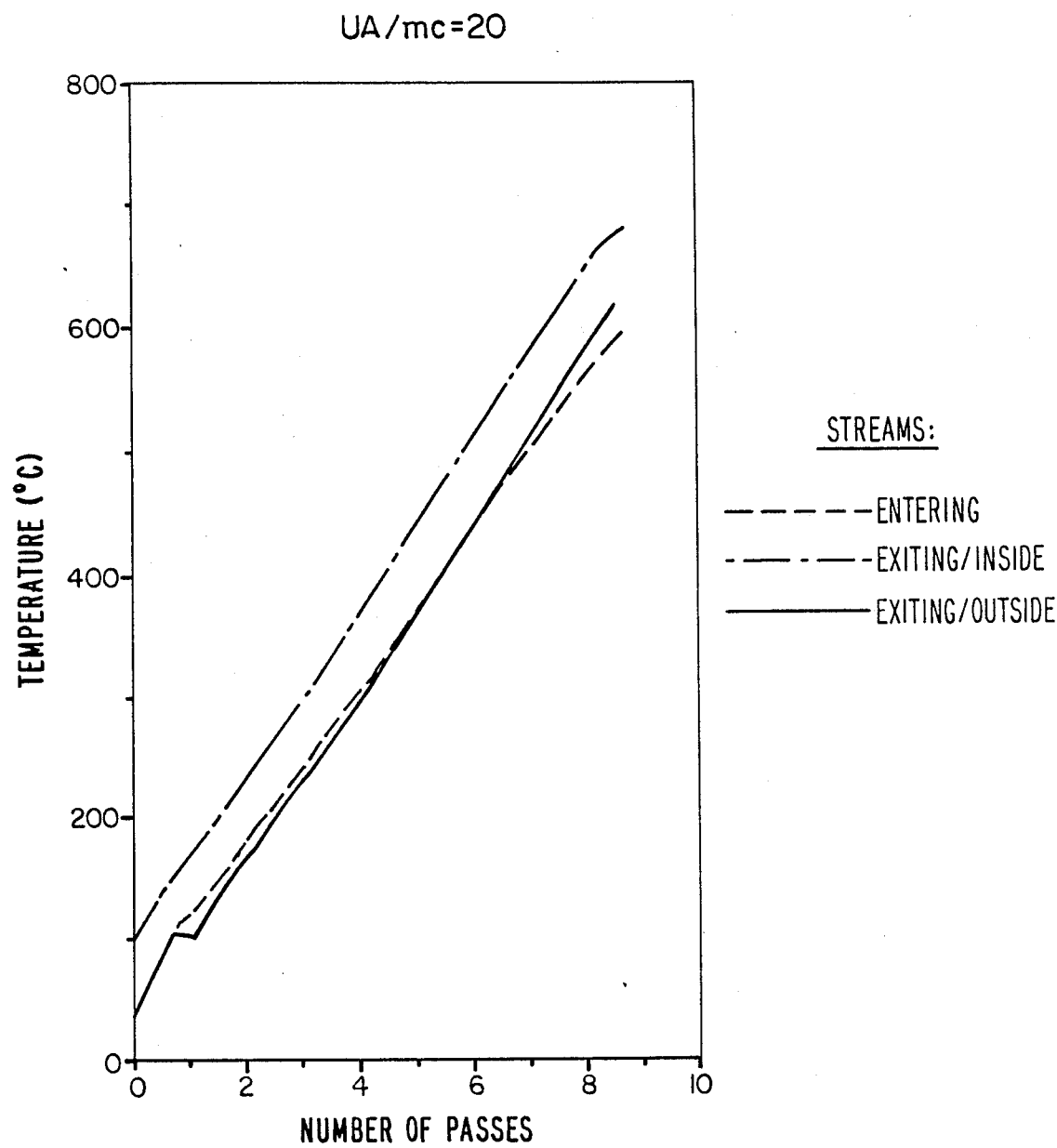
Figure 8C:
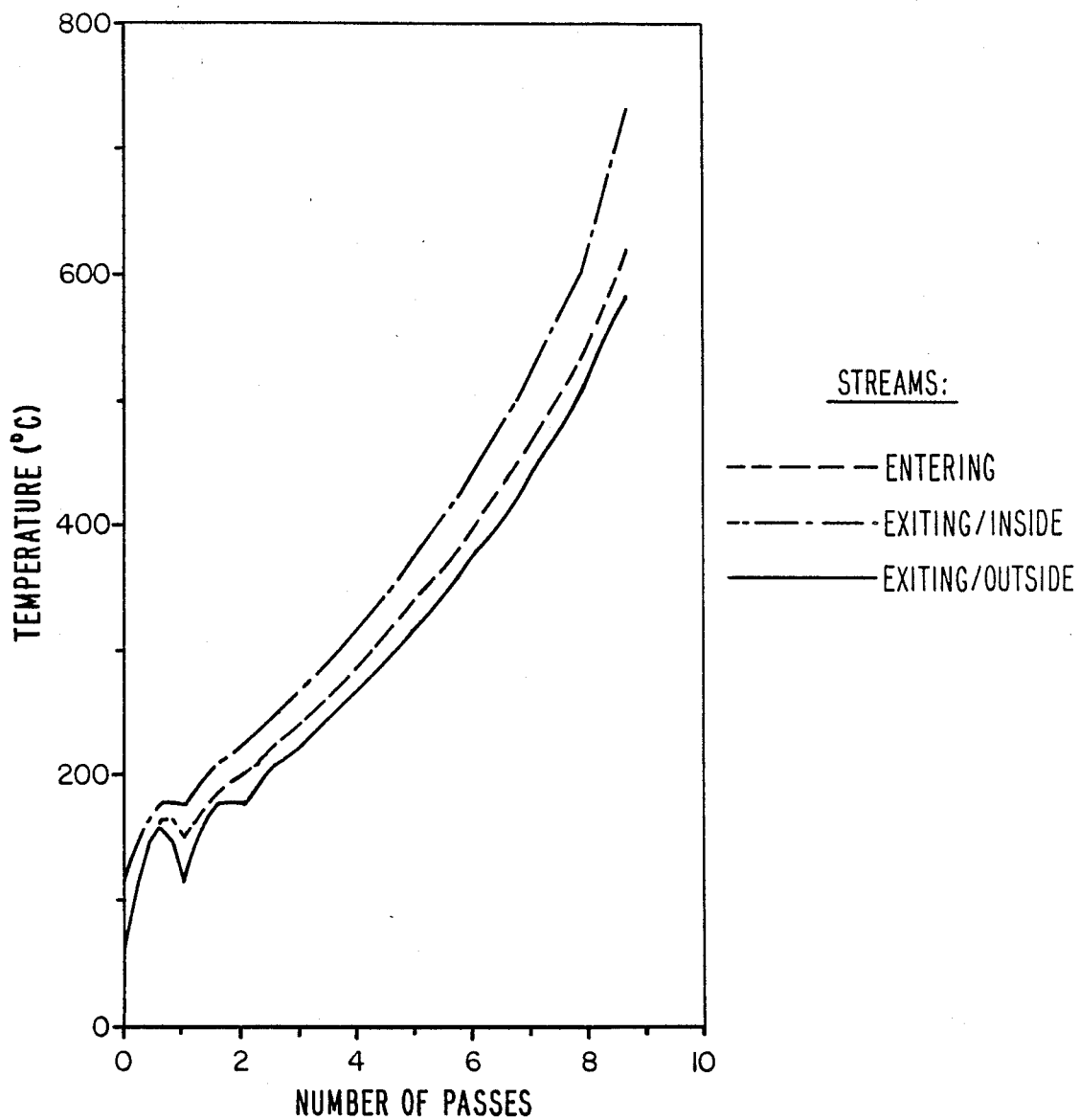

FIGS. 8A, 8B, and 8C show why the figure of merit M passes through a maximum as the flow rate is varied in any certain spiral. FIGS. 8A, 8B, and 8C are graphs showing the temperature at various positions within the prototype spiral. The figures plot temperature versus the number of "passes", or turns, through the spiral. These figures display the data for both the entering stream and the exiting stream. The "inside" exiting stream is flowing through the channel just inside of the entering stream. The "outside" exiting stream is the same stream flowing in the channel just outside of the entering stream. These profiles were generated by a computer from the mathematical model. The flow rate is decreasing, and UA/mC is increasing through FIGS. 8A, 8B, and 8C. In FIG. 8A, the temperature of the entering stream is below the temperature of both the inside and the outside exiting exiting streams. Here, the entering stream is being heated from both sides of the channel. In FIG. 8A, at the highest flow rate, the value of UA/mC is only 5, so that the value of M lies close to the line having a slope of unity, for which M=UA/mC. This point is indicated as "8A" in FIG. 5.

In FIG. 8B, the temperature profile for the outside exiting stream nearly coincides with the profile for the entering stream. Now the entering stream is being heated from only one side of the channel. In spite of this penalty, point "8B" falls at or near the maximum in the curve in FIG. 5. For point "8B", UA/mC 20, M=7.48, and M=0.38(UA/mC). When the entering stream is heated from only one side instead of from both sides, as it was in FIG. 8A, one would expect M to be decreased by a factor of about two, to 0.5(UA/mC). The ratio 0.38 is not in perfect agreement with 0.5, and the discrepancy may result from approximations in our mathematical model. It may turn out that M is more nonlinear than expected.

In FIG. 8C, for the lowest flow rate and the highest value of UA/mC, the profile of the outside exiting stream lies below the profile for the entering stream. Now the entering stream is being heated from one side of the channel, and is being cooled from the other side. This would predict a value of M less than the value in FIG. 8B, and point "8C" in FIG. 5 shows that this is the case.

Let us summarize what has been shown. When the flow rate is large, so that UA/mC is less than about 5, M is nearly equal to UA/mC. This was shown mathematically. When the flow rate continues to decrease, and UA/mC continues to increase, M reaches a maximum of 0.4–0.5 of UA/mC, and then decreases. This we infer from FIG. 5. FIG. 5 does not constitute a mathematical proof, but we believe it is convincing.

An important assumption in our mathematical model was expressed by Equation (1), $$h = 2.69 k/d$$

which applies strictly only in the region of the maximum in the curve in FIG. 5, where the gas is being heated through only one wall of the channel. A more rigorous model would have allowed the coefficient h to vary through the conditions of FIGS. 8A, 8B, and 8C.

The present invention thus includes several possible methods of designing a catalytic air cleaner, according to certain given conditions. For example, suppose that the air flow rate, the temperature of entering air ($T_1$), the temperature of exiting air ($T_2$), the temperature of air at the core of the spiral ($T_3$), and the maximum acceptable pressure drop are specified. Then one calculates the figure of merit M, from the given temperatures. Next, one calculates M/R, where R is a constant in the range of about 0.35–0.45. The value of M/R is an estimate of UA/mC, as described above. The latter range is taken from the values in the last column of Table II. It is possible that values outside this range could be used.

One then selects values for the radius of the innermost turn of the spiral, for the spacing between the turns, and for the axial length of the spiral, and calculates the average heat transfer coefficient, U. One then calculates the area of the spiral A, from the estimated value of UA/mC, and the length of the flow path in the spiral, from the value of A and the axial length of the spiral. Finally, one calculates the pressure drop through the spiral. It it is too large, one adjusts the values of the spacing and the axial length, and repeats the above calculations, until the calculated pressure drop is below the specified maximum.

In a variation of the above-described method, the radius of the outermost turn and the axial length (i.e., the total volume) of the catalytic air cleaner are specified, instead of the air flow rate. In this case, one chooses values for the radius of the innermost turn, and the spacing between the turns, which, together with the other given information, determines the total area A of the spiral. One estimates the value of UA/mC as before, and, from a knowledge of U, A, and C, one can calculate the flow rate m. From the knowledge of the dimensions of the spiral, and the flow rate, one can calculate the pressure drop. If it is too high, the spacing between turns is adjusted, and the calculations repeated until the pressure drop is at an acceptable level.

Good design of the end closures is essential to achieving a high value of M. The end closures must (1) be of minimum weight, (2) present a minimum path for the short circuit conduction of heat radially between the turns of the spiral, (3) seal the turns against the leakage of air, and (4) present a relatively flat surface that can be covered with insulation, especially near the core where the highest temperature exists.

Figure 9:
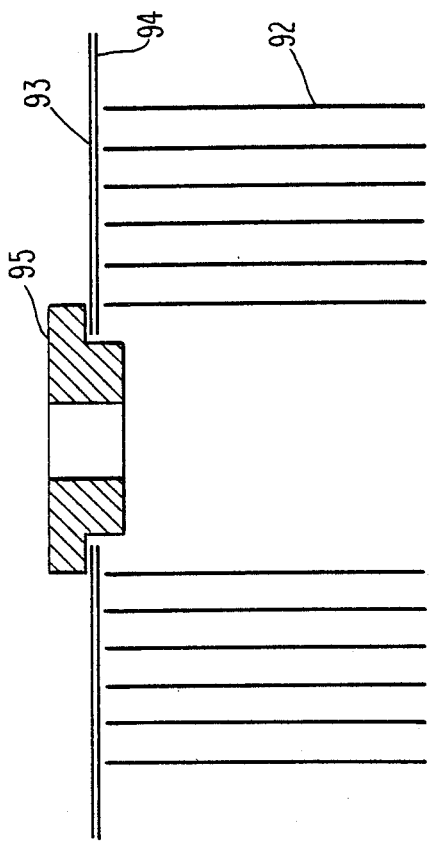
FIG. 9 is a fragmentary cross-sectional view showing one possible construction of the end closures on the spiral.

FIG. 9 is a fragmentary cross-sectional view that shows a proposed construction of the end closures. Some of the turns of the spiral are indicated by reference numeral 92. The turns are capped by a flat sheet of foil 93. Under the flat sheet is a sheet of brazing alloy 94. Sheets 93 and 94, and the abutting edges of the turns 92 are heated inductively by an alternating electric current, in an inert atmosphere. Foil sheet 94 melts and forms the joint between the turns of spiral 92 and end sheet 93. End cap 95 serves to insulate the heater 34 from the turns of the spiral.

The whole assembly can be heated up slowly in a furnace. Inductive heating is preferred because the heating can be done quickly so that the catalyst coating is not exposed, too long, to a high temperature that would lower the activity of the catalyst.

While the invention has been described with respect to a particular embodiment, it is understood that the invention may be modified. Other means can be used to seal the ends of the spiral. Different configurations of fins may be employed. The type and size of the heater at the core of the spiral may also be modified. These and other similar changes are to be deemed within the spirit and scope of the following claims.

TABLE I

| Experimental Results with the Prototype Double Spiral | | | | | |
|---|---|---|---|---|---|
| Wattage input to core heater | 50 | 63 | 85 | 110 | 140 |
| Air flow rate entering the spiral, in liters per hour | 1825 | 1825 | 1825 | 1825 | 1825 |
| Flow rate leaving the spiral | 1845 | 1755 | 1794 | 1794 | 1768 |
| Loss of flow rate, in percent | 0 | 4 | 2 | 2 | 3 |
| Calculated heat loss, watts[1] | 33 | 46 | 58 | 75 | 98 |
| Loss of input wattage, in percent | 66 | 73 | 68 | 63 | 70 |
| Air temperatures, °C.: | | | | | |
| Entering the spiral ($T_1$) | 24 | 26 | 26 | 26 | 26 |
| Leaving the spiral ($T_2$) | 52 | 60 | 71 | 84 | 97 |
| Entering the core ($T_3$) | 267 | 329 | 421 | 517 | 604 |
| Leaving the core ($T_4$) | 292 | 356 | 451 | 548 | 630 |
| $(T_3-T_1)/(T_2-T_1) \simeq M$ | 8.7 | 8.9 | 8.8 | 8.5 | 8.1 |

[1]The wattage input minus the heat added to the air, as calculated from $T_2-T_1$ Table II

| Designing a Spiral Heat Exchanger with the Mathematical Model | | | | | |
|---|---|---|---|---|---|
| | Inputs to the Model | | | Output | |
| Number of Turns | Radius of Innermost Turn, cm | Spacing Between Turns, cm | UA/mC | M $(T_3-T_1)/(T_2-T_1)$ | M/(UA/mC) |
| 7.5 | 2.0 | 0.5 | 14.7 | 6.52 | 0.44 |
| 7.5 | 2.0 | 0.4 | 13.7 | 6.55 | |
| 7.5 | 2.0 | 0.4 | 17.2 | 6.63 | 0.39 |
| 7.5 | 2.0 | 0.4 | 19.6 | 6.57 | |
| 7.5 | 2.0 | 0.2 | 13.1 | 6.74 | |
| 7.5 | 2.0 | 0.2 | 15.3 | 6.85 | 0.45 |
| 7.5 | 2.0 | 0.2 | 18.4 | 6.82 | |
| 8.75[1] | 2.0 | 0.4 | 19.7 | 7.59 | |
| 8.75 | 2.0 | 0.5 | 16.7 | 7.45 | |
| 8.75 | 2.0 | 0.5 | 20.9 | 7.48 | 0.36 |
| 8.75 | 2.0 | 0.5 | 27.8 | 7.18 | |
| 12.0 | 2.0 | 0.5 | 22.3 | 9.95 | |
| 12.0 | 2.0 | 0.5 | 26.4 | 10.02 | 0.38 |
| 12.0 | 2.0 | 0.5 | 29.0 | 9.99 | |

Table II-continued

Designing a Spiral Heat Exchanger with the Mathematical Model

| | Inputs to the Model | | | Output | |
| --- | --- | --- | --- | --- | --- |
| Number of Turns | Radius of Innermost Turn, cm | Spacing Between Turns, cm | UA/mC | M $(T_3-T_1)/(T_2-T_1)$ | M/(UA/mC) |
| 18.0 | 2.0 | 0.5 | 35.5 | 14.54 | |
| 18.0 | 2.0 | 0.5 | 40.2 | 14.57 | 0.36 |
| 18.0 | 2.0 | 0.5 | 46.4 | 14.43 | |

[1]This point is plotted in FIG. 5.

What is claimed is:

1. A catalytic air cleaner, comprising:
   (a) a double spiral formed of two strips wound together, the strips being coated with a combustion catalyst, the spiral defining two flow channels, one channel leading into the core of the spiral and the other channel leading out of the spiral, both channels being fluidly interconnected and comprising substantially unobstructed spiral flow paths for air,
   (b) a heater disposed at the core of the spiral, the heater comprising a generally cylindrical housing, the housing having a plurality of radial fins extending outwardly from the housing, the heater and fins occupying substantially all of the space within the core, the fins being disposed to transmit heat from the heater to the air entering the spiral, and
   (c) closure means on each end of the spiral, the closure means also comprising means for anchoring and sealing the layers of the spiral.

2. The catalytic air cleaner of claim 1, wherein the strips are made of metal.

3. The catalytic air cleaner of claim 1, wherein the heater is an electric heater.

4. The catalytic air cleaner of claim 1, wherein the strips are made of metal foil.

5. The catalytic air cleaner of claim 4, wherein the foil is corrugated.

6. The air cleaner of claim 1, wherein the heater means is the sole source of applied heat, and arranged to apply heat only at the core of the spiral.

7. A catalytic air cleaner, comprising:
   (a) a double spiral formed of two strips wound together, the strips being coated with a catalyst, the spiral defining two flow channels, one channel leading into the core of the spiral and the other channel leading out of the spiral, both channels being fluidly interconnected and comprising substantially unobstructed spiral flow paths for air,
   (b) heater means, disposed within the core of the spiral, for transmitting heat to the air entering the core of the spiral, and
   (c) closure means on each end of the spiral.

8. The cleaner of claim 7, wherein the closure means comprises a flat sheet of foil which is joined to the abutting edges of the turns of the spiral by brazing.

9. The air cleaner of claim 7, wherein the heater means is the sole source of applied heat, and arranged to apply heat only at the core of the spiral.

10. A catalytic air cleaner, comprising:
    (a) a double spiral, formed of two strips wound together, the strips being coated with a combustion catalyst, the spiral defining two flow channels, one channel leading into the core of the spiral and the other channel leading out of the spiral, both channels being fluidly interconnected and comprising substantially unobstructed spiral flow paths for air,
    (b) a heater disposed at the core of the spiral, the heater comprising a generally cylindrical housing, the housing having a plurality of radial fins extending outwardly from the housing, the heater and fins occupying substantially all of the space within the core, wherein the fins are disposed to transmit heat from the heater to the air entering the spiral,
    (c) closure means on each end of the spiral, the closure means also comprising means for anchoring and sealing the layers, of the spiral, and
    (d) means for mounting the heater within the core, the mounting means being arranged to insulate thermally the heater from the closure means, whereby the heat loss is minimized.

11. The air cleaner of claim 10, wherein the strips are made of metal foil, and wherein the foil is corrugated.

12. The air cleaner of claim 10, wherein the heater means is the sole source of applied heat, and arranged to apply heat only at the core of the spiral.

* * * * *